United States Patent [19]

Torgrimsen et al.

[11] Patent Number: 5,337,843
[45] Date of Patent: Aug. 16, 1994

[54] HOLE OPENER FOR THE TOP HOLE SECTION OF OIL/GAS WELLS

[75] Inventors: Tor Torgrimsen, Stavanger; Kjell-Egil Stangeland, Kleppe; Arnold Furre, Sandnes, all of Norway

[73] Assignee: Kverneland Klepp AS, Kvernaland, Norway

[21] Appl. No.: 18,556

[22] Filed: Feb. 17, 1993

[30] Foreign Application Priority Data

Feb. 17, 1992 [NO] Norway .................. 920611

[51] Int. Cl.$^5$ .................. E21B 10/24; E21B 10/28
[52] U.S. Cl. .................. 175/334; 175/229; 175/344
[58] Field of Search .......... 175/334, 335, 337, 344, 175/359, 367, 369, 385, 391, 228, 227, 229

[56] References Cited

U.S. PATENT DOCUMENTS

| | | |
|---|---|---|
| 1,725,299 | 8/1929 | Pickin . |
| 1,747,908 | 2/1930 | Seifert .................. 175/334 |
| 1,896,231 | 2/1933 | Fletcher .................. 175/228 |
| 1,909,128 | 5/1933 | Scott et al. . |
| 1,909,994 | 5/1933 | Wright . |
| 2,124,521 | 7/1938 | Williams et al. .................. 175/366 |
| 2,174,102 | 9/1939 | Catland . |
| 2,184,108 | 12/1939 | Akeyson . |
| 2,790,623 | 4/1957 | Pate et al. . |
| 2,886,292 | 5/1959 | Peterson . |
| 3,237,705 | 3/1966 | Williams, Jr. .................. 175/406 |
| 3,244,459 | 4/1966 | Ortloff . |
| 3,285,355 | 11/1966 | Neilson et al. .................. 175/334 |
| 3,303,898 | 2/1967 | Bercaru .................. 175/228 |
| 3,453,755 | 7/1969 | Trudeau . |
| 3,529,683 | 9/1970 | Mays . |
| 4,323,131 | 4/1982 | Allee . |
| 4,706,765 | 11/1987 | Lee et al. .................. 175/334 |

FOREIGN PATENT DOCUMENTS

| | | |
|---|---|---|
| 1783208 | 2/1959 | Fed. Rep. of Germany . |
| 1102674 | 3/1961 | Fed. Rep. of Germany . |
| 1150035 | 6/1963 | Fed. Rep. of Germany ...... 175/344 |
| 1186427 | 2/1965 | Fed. Rep. of Germany . |
| 1191317 | 4/1965 | Fed. Rep. of Germany . |
| 1996503 | 11/1968 | Fed. Rep. of Germany . |
| 2162863 | 7/1972 | Fed. Rep. of Germany . |
| 2627553 | 1/1977 | Fed. Rep. of Germany . |
| 3114927A1 | 2/1982 | Fed. Rep. of Germany . |
| 3217305 | 12/1982 | Fed. Rep. of Germany . |
| 3805862 | 9/1988 | Fed. Rep. of Germany . |
| 421873 | 4/1967 | Switzerland . |
| 715786 | 2/1980 | U.S.S.R. .................. 175/391 |
| 734236 | 7/1955 | United Kingdom . |
| 989357 | 1/1962 | United Kingdom . |
| 1111256 | 8/1966 | United Kingdom . |
| 1348670 | 4/1971 | United Kingdom . |
| 1292409 | 5/1971 | United Kingdom . |
| 1518616 | 5/1975 | United Kingdom . |
| 2168737 | 6/1986 | United Kingdom . |

*Primary Examiner*—David J. Bagnell
*Attorney, Agent, or Firm*—Foley & Lardner

[57] ABSTRACT

A hole opener used in conjunction with drilling in at least one of boulder and rubble stone formations includes first and second sets of cutters. Each of the cutters of the first and second sets of cutters has cutter teeth thereon and further include a shaft. The hole opener also includes a tubular carrier body, a first device for fixing the first set of cutters to the tubular carrier body so that the first set of cutters is positioned in a common first lateral plane with respect to a longitudinal axis of the tubular carrier body, and second device for fixing the second set of cutters to the tubular carrier body so that the second set of cutters is located in a second lateral plane with respect to the longitudinal axis of the tubular carrier body and at an axial distance from the first set of cutters along the longitudinal axis. The first device combined with each of the cutters of the first set of cutters extends a first radial distance from the longitudinal axis, the second device combined with each of the cutters of the second set of cutters extends a second radial distance from the longitudinal axis, and the first radial distance is less than the second radial distance. Each of the shafts of the cutters of the first and second sets of cutters are rotatably and releasably connected to a corresponding one of the first and second devices.

7 Claims, 4 Drawing Sheets

HOLE OPENER FOR THE TOP HOLE SECTION OF OIL/GAS WELLS

Background of the invention

1. Field of the Invention

This invention relates to a hole opener of the kind used in drilling the top hole section of oil/gas wells in order to widen a predrilled smaller hole to a hole having a larger diameter, the hole opener comprising a tubular body having coupling means at each end to be coupled to adjacent drill string components, the pipe body carries attachment means for at least one set of cutters, e.g. in the form of rotary cutter wheels, and the hole opener preferably is assigned a stabilizer having wear parts.

2. Description of the Related Art

The hole openers available on the market today comprise a tubular stem having mounted thereon bits and rollers for the cutting of a hole and stabilizing the drill string. As coupling means at each end for connection to adjacent drill string components, these known hole openers have one threaded connection at the end being the lowermost in the position of use with vertical drilling, for connection to the bit or other guidance, and a second threaded connection at the end being the uppermost in the position of use, for connection to the overlying drill string section or component, e.g. collar.

When drilling such a top hole section in areas comprising boulder or rubble stone formation, it has been found that conventional and other prior art hole openers do not function satisfactorily, and the desired widening of the hole diameter has been very difficult to effect.

The problems primarily associated with hole openers when drilling in boulder or rubble stone formation are the following:

With drilling in boulder or rubble stone formation, the bit/hole opener assembly is apt to skid outwards from a vertical position, such that it becomes difficult to drill a vertical hole. Due to the fact that boulder or rubble stone formation usually is a very hard formation, only a very low drilling speed (0,5-1 meter per hour) can be maintained. Boulder or rubble stones laying in an otherwise loose formation, are very difficult to drill through. Because of the large wear and tear on known hole openers and loss of individual parts, e.g. cones, the repair costs become very high. The wearing is especially large on the hole opener body beneath the guidance wings of the stabilizer, on the guidance wings, on the cones and cutters, on saddles for drilling cone, on stabilizing wings, on lateral rollers as well as at the transition portion between the stabilizing wings and the upper hole opener body.

Typical drilling-technical problems with hole opening in boulder or rubble stone formation are the following:

It is almost impossible to open up the hole to e.g. 36 inches in one pass. Therefore, it is customary first to drill a pilot hole of e.g. 17½ inches prior to the hole being opened to full size. There are risks that boulder or rubble stones may fall into a drilled hole above the hole opener, which again may lead to a wedging of the drill string. In such situations, one must, if this in any way is possible, increase the drilling speed, in order to hurl boulder or rubble stones which have landed in the bore hole, out into the formation again through centrifugal action. A very high pumping capacity is required in order to achieve a good hole cleaning or possibly a larger liquid flow through guidance (bull-nose, bit), because the liquid passes the hole opener irrespectively. On hole opener/bit, so large a weight is required that it is difficult to provide the same, but, if possible, large collars should be used, e.g. having a diameter equal to 11¼ inches or more.

SUMMARY OF THE INVENTION

A general object of the present invention is to provide a hole opener of the kind concerned, which to a substantial degree better manages the above difficult conditions one often encounters when drilling in boulder or rubble stone formations.

A hole opener formed in accordance with the present invention should exhibit the following properties: It must be adapted to drill in boulder or rubble stone; it must be well protected against wearing; easy exchange possibilities must exist in order to rapidly and suitably effect exchange of all wear parts; it must be capable of being easily handled on board the platform deck; the stabilizing should be the best possible, and the constructive design of the hole opener must be strong and sturdy, representing the general objects of the invention.

A specific object of the invention is to form and adapt the hole opener such that the cutters through their location ensure that boulder or rubble stones only may come into contact with a minimum number of cutters simultaneously. The hole opener shall also be well suited to drill loose mass having good penetration, subsequently to the boulder or rubble stone layer being drilled through.

The above objects are realized through the features appearing the appended claims.

BRIEF DESCRIPTION OF THE DRAWINGS

An example of preferred embodiments is illustrated on the accompanying drawings, and is further explained referring thereto, wherein.

DETAILED DESCRIPTION OF THE PREFERRED EMBODIMENTS

Figure 1:
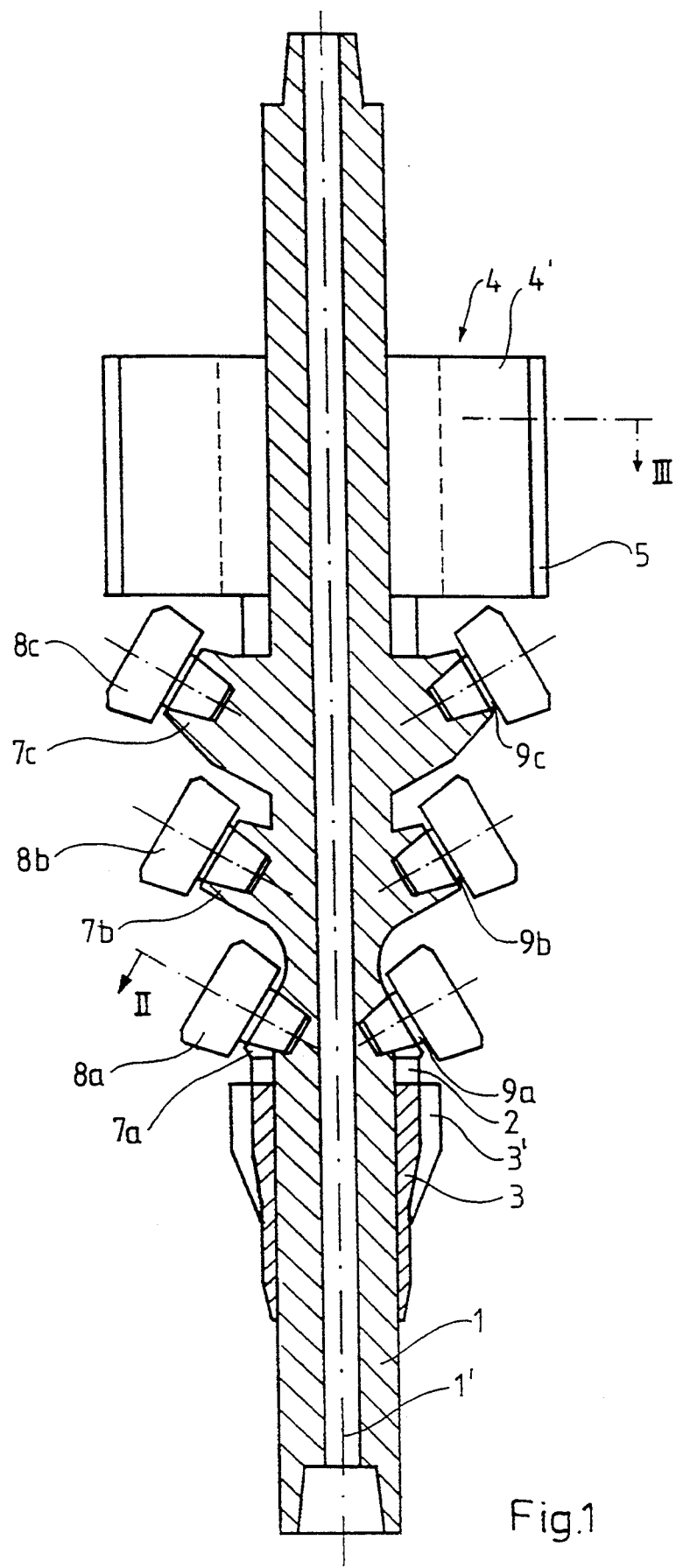
FIG. 1 shows in side elevational view a general drawing of a hole opener formed in accordance with the present invention.
Figure 3:
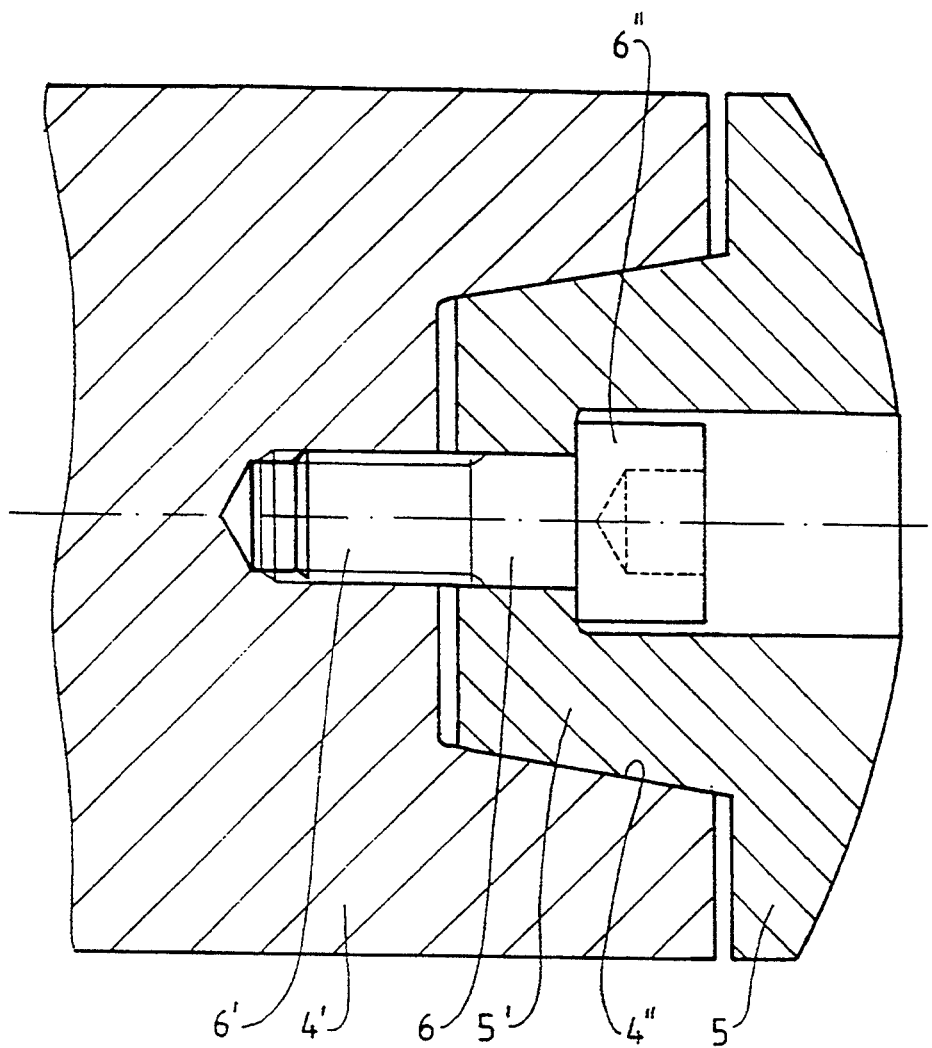
FIG. 3 shows, also on a larger scale, a partial view along the sectional plan III in FIG. 1, illustrating the replaceable attachment of a wear element at the outer end of one of the guide wings of the stabilizer.

FIG. 1 shows a hole opener which is built up on a tubular body or carrier pipe 1, reference numerals 2 and 3 respectively denoting a thrust ring and an exchangeable wear ring having guide fins 3', 4 denoting a stabilizer in the form of a wear pipe having stabilizing fins 4', an outer wear member being indicated at 5, see especially FIG. 3.

The thrust ring 2 is welded to the carrier pipe 1 of the hole opener and serves to form a stop member for the exchangeable wear ring 3.

It appears from FIG. 3 that the wear member 5 has a conical anchoring part 5' accommodated within a complementarily shaped cavity 4'' in the free end portion of the respective stablizer fin 4', the connection being secured by means of a head screw 6, the threaded shaft end 6' thereof being screwed into an internally threaded bore in the stabilizer fin 4', and the head 6'' thereof being withdrawn into a stepped bore in the wear member 5.

The carrier pipe 1 of the hole opener is formed with fixing means 7a, 7b and 7c for three sets of turnable cutter wheels 8a, 8b and 8c.

Figure 4:
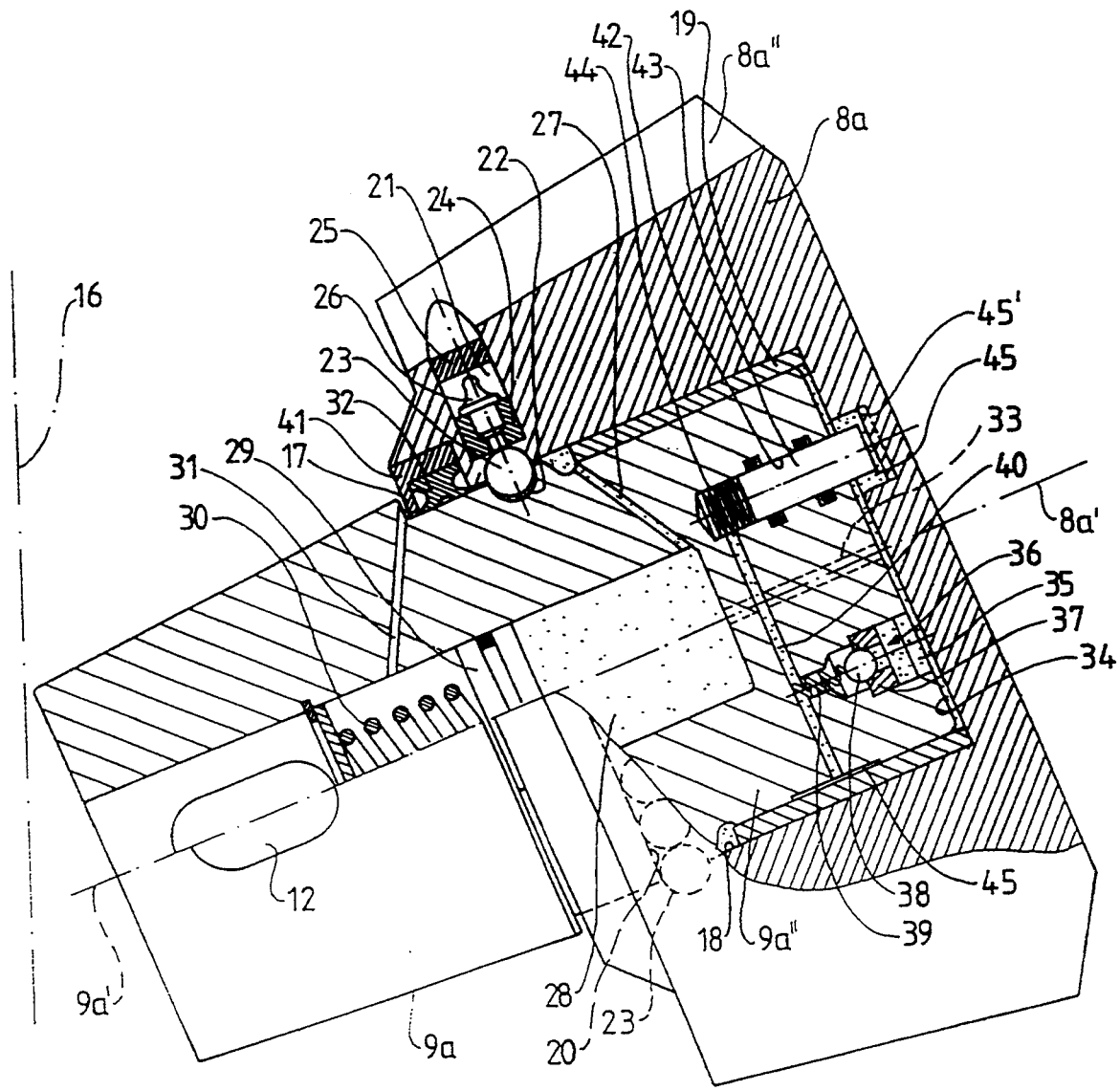
FIG. 4 shows a side elevational view, partially in axial section, of a rotary cutter wheel which is replaceably mounted on the shaft thereof (here, the sectional plan is 90 degrees angularly displaced in relation to the sectional plan according to FIG. 2, where the cutter wheel has been omitted, and where only the free end portion of the shaft has been shown).

The shafts of the cutter wheels 8a–8c are respectively denoted by 9a, 9b and 9c. Later it will be explained how the shafts 9a–9c are fastened within the fixing means 7a–7c of the hole opener body (FIG. 2), and how each cutter wheel is rotatively supported on the respective shaft 9a–9c thereof (FIG. 4).

Hole openers designed in accordance with conventional technique comprise only one set of cutter wheels, e.g. 8a.

According to the present invention, the set of cutter wheels 8a, where the individual cutter wheels are diametrally opposing each other and occupying a common lateral plane with respect to the axis of the carrier pipe 1, assigned at least one further set of cutter wheels 8b and/or 8c.

The additional sets of cutter wheels 8b and/or 8c are in each set arranged diametrally opposite each other, but they occupy a lateral plane of their own with respect to the carrier pipe axis, the lateral plane for the cutter wheels 8a being placed at an axial distance from the lateral plane for the cutter wheels 8b, the lateral plane thereof being placed at an axial distance from the lateral plane for the cutter wheels 8c.

Moreover, each cutter wheel of the respective set of cutter wheels 8b is placed at a larger radial distance from the carrier pipe axis that the cutter wheels of the set 8a, while the cutter wheels of the set of cutter wheels 8c are placed at a larger radial distance from the carrier pipe axis than both the cutter wheels 8a and the cutter wheels 8b.

The cutter wheels 8a–8c of the three sets differ from each other also in that the set of cutter wheels 8b in reality is turned 60 degrees around the axis 1' of the carrier pipe in relation to the position wherein they (for the sake of simplicity and general illustration) have been drawn in FIG. 1. In a similar way, the set of cutter wheels 8c is in the reality turned 120 degrees in relation to the position drawn.

In the axial section of FIG. 1, it may look like the fixing means 7a–7c for the cutter wheels are formed in one piece integrally with the carrier pipe 1 of the hole opener. Even if such a design is conceivable, it is practically more appropriate to fasten the fixing means 7a–7c on the carrier pipe 1 through welding, the fixing means being worked subsequent to welding.

The shafts 9a–9c of the cutter wheels 8a–8c are attached through wedging within the fixing means 7a–7c.

Figure 2:
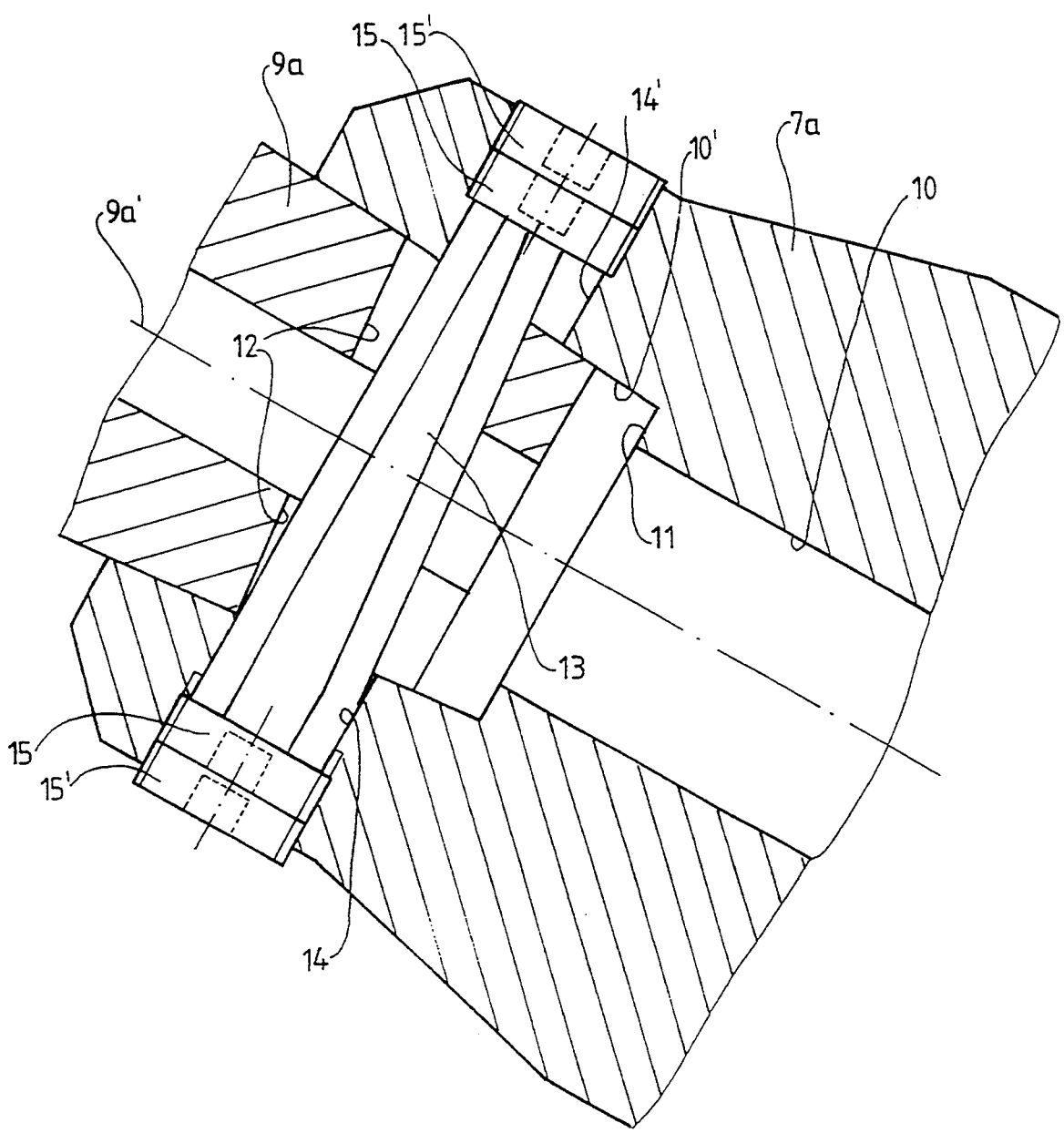
FIG. 2 shows, on a larger scale, a partial section along the sectional plan II in FIG. 1, illustrating the attachment of the cutter wheel shaft within one of the fixing means of the hole opener body.

In this connection, reference is made to FIG. 2, showing a section substantially along the indicated sectional plan II in FIG. 1. In this enlarged sectional view, only the adjacent free end portions of cutter wheel shaft 9a and fixing means 7a are illustrated.

The fixing means 7a has a central bore 10 which may be through-going, and which at the external portion passes into an outwardly/inwardly conically tapering cavity 10', with numeral 11 denoting a shoulder which may constitute a stop surface between bore 10 and conical cavity 10'.

The shaft 9a of a cutter wheel (8a) has a conical shape complementary to and corresponding to the conical cavity 10'; and is formed with a through-going lateral hole 12 forming a nonperpendicular angle with the axis 9a' of the shaft 9a. This lateral hole 12 has an oval cross-sectional shape, see FIG. 4.

In an attachment position, lateral hole 12 serves to accommodate a wedge 13 which, in driven-in position, is accommodated also by the fixing means 7a within holes 14, 14' at either side of the shaft 9a. The purpose of the inclined position of the lateral hole 12 of the shaft 9a is as follows: When the wedge 13 is in the course of being driven in from one side, the chamfered edge of the wedge 13 will rest against the chamfered edge of the shaft 9a and press and lock the latter within the conical cavity 10'. Subsequent to the insertion of the wedge 13, the holes 14, 14' are sealed with plugs 15 having counter plugs 15' in order to prevent the wedge 13 from falling out. Upon disassembling, the plugs 15, 15' are removed, and the wedge 13 is simply beaten out in a direction opposite to the driving-in direction, whereafter shaft 9a with cutter wheel (not shown) (8a) may be pulled easily and suitably out from the conical cavity 10' of the fixing means 7a.

As mentioned, the stabilizer 4 has the form of a wear pipe having stabilizing wings or fins 4'. Wear the wear pipe with stabilizer wings may be shaped according to an imaginary helical line, and this helical line shape may suitably continue along the carrier pipe 1, through the uppermost fixing means 7c with the cutter wheels 8c, down to the lowermost set of cutter wheels 8a.

Wear ring 3 and stabilizer 4 are, as known per se, exchangeable. According to the prior art technique, the interchangeable/demountable assemlage device for such components consists of threaded joints. As the components rotate during operation and serve to transfer moments, the screw threads must be designed such that the respective component does not unscrew itself, but screws itself firmly in relation to the carrier pipe 1. This results in that wear ring 3 and/or stabilizer 4 in the course of time will have screwed itself/themselves so firmly unto the carrier pipe 1 that the connection between carrier pipe 1 on the one hand and wear ring 3 or stablizer 4 on the other hand can not be loosened or can only be loosened after major encroachment.

According to the invention, wear ring 3 and stabilizer 4 are, therefore, to be mounted on the carrier pipe 1 by means of a claw coupling, jaw clutch, dog or the like, in order to secure a rapid and suitable abolition of the locking action as to well as enable a simple disassembling of the respective component. Such couplings and clutches (claw coupling, jaw clutch or similar coupling/clutch) are not shown in the drawings.

The support of each cutter wheel 8a–8c differs from other, prior art cutter wheel supports in that one, according to the present invention, uses a one-sided shaft support. Thereby, substantial wearing problems associated with conventional fork arms supporting the cutters are eliminated.

The shafts 9a–9c for the cutter wheels are made from a high-grade tool steel as well as being special heat treated. The heat treatment may consist in hardening, drawing (tempering) and nitriding. Thereafter follow grinding and polishing (rubbing) of bearing surfaces. The cutter wheels are made from special steel which is heat treated. After the heat treatment follows internal honing (glazing), and any intermediate land areas between resulting external teeth (not shown) are milled out. The tooth design may substantially follow the shape of conventional cutter wheel teeth, until experiments to come possibly may necessitate larger or smaller modifications.

The cutter wheels 8a–8c are, preferably, made as disposable cutter to be discarded after a one time use. The shafts 9a–9c not being exposed to as the cutter wheels 8a–8c, are assumed to endure to be used several times. In all circumstances, it is appropriate that the rotary support of each cutter wheel 8a–8c occurs on the assigned shaft 9a–9c.

Thus, upon the assemblage of the shaft and the cutter wheel, a relatively turnable connection is produced, such that the cutter wheel may rotate in relation to the shaft, and a connection is produced which is easy to dismount, such that the cutter wheel may easily be exchanged.

Reference is now made to FIG. 4, showing one cutter unit (cutter wheel with shaft) in an assembled condition.

In order to show the orientation of the axis 9a', 8a' of the cutter unit, the axis 16 of the drill string is indicated in dot-dash line.

From FIG. 4, the oval cross-sectional shape of the wedge-accommodating lateral hole 12, appears perpendicular in relation to FIG. 2; and the cutter wheel shaft 9a, beyond the conical end portion cooperating with the conical cavity 10' of the fixing means 7a of FIG. 2, has a coaxial cylindrical portion 9a'' in the continuation thereof, a shoulder between the two portions of the shaft 9a being denoted at reference numeral 17.

The cutter wheel 8a is formed with peripherical teeth 8a'' which may be formed substantially in accordance with prior art technique, and which are formed in one piece with the cutter wheel's 8a carrier body which has the shape of an essentially cup-shaped hollow piece having a concentrical cavity 18 which is open towards the shaft 9a and which is formed complementarily to the cylindrical portion 9a'' of the shaft 9a, the shaft-accommodating cavity 18 in the carrier body of the cutter wheel 8a being assigned a somewhat larger diameter than the cylindrical portion 9a'' of the shaft 9a over the major part of the axial extent thereof for accommodating a babbitt (bush) 19 between the cavity-defining internal wall and the shaft portion 19a''.

The cup-shaped hollow piece constituting the carrier body of the cutter wheel 8a, adjacent the open end thereof, is formed with an internal circle groove 20 communicating with a radially directed, outwardly open channel 21.

Radially opposite the internal groove 20 of the cutter wheel, the cylindrical portion 9a'' of the shaft 9a has been formed with an external circle groove 22 having a substantially semi-circular cross section. The external circle groove 22 of the shaft 9a serves to partly accommodate a number of bearing balls 23 which, likewise, are partly accommodated within the internal circle groove 20 of the cutter wheel 8a.

Prior to assembling the cutter unit (cutter wheel 8a with shaft), the balls 23 are not mounted. The same goes for two plugs 24, 25 and an intermediate lubricating nipple 26 which, according to FIG. 4, is shown arranged within the radially directed, outwardly open channel 21, which inwardly communicates with the two circle grooves 20, 22 of the cutter wheel 8a and of the shaft 9a, respectively.

The innermost plug 24 is formed for retaining the lubricating nipple 26, the outer plug 25 serving as a peg or stopper means.

The assembling takes place such that one first fills as much lubricant as possible into all internal cavities prior to the cutter wheel 8a being mounted onto the shaft 9a, whereafter the balls 23 are inserted into the closed (except for the channel 21) annulus having approximately circle-shaped cross section and being defined by the two mutually adjacent circle grooves 20, 22, having approximately semicircular cross section and being formed in the cutter wheel 8a and in the shaft 9a, respectively. When all balls 23 are positioned within said annulus 20, 22, the plug 24 with the lubricating nipple 26 is mounted and, thereafter, the outer plug 25 within said radial channel 21.

Thereby, the cutter wheel 8a is turnably connected with the shaft 9a, whereafter the balls 23 will take up the axial load that might arise.

The filling of lubricant is, with the embodiment shown, effected in that the lubricant is pumped through the lubricating nipple 26. From the lubricating nipple 26, the lubricant is pressed through the groove 22 and an internal, inclinedly lateral channel 27 in the shaft 9a and lands in a lubricant reservoir 28 which is formed internally within the shaft 9a.

Within the lubricant reservoir 28 of the shaft 9a, a piston 29 has been arranged. With the supply of lubricant to the reservoir 28, the piston will be urged back until an assigned return spring 30 is wholly compressed. Then, the piston 29 uncovers an aperture to a lateral channel 31, extending from the reservoir 28 and through which lubricant is guided to the surface of the shaft outside a sealing ring 32. Upon continued pumping of lubricant through the lubricating nipple 26, lubricant will be urged through channel 31. Surplus lubricant which is squeezed out through channel 31 is a certain indication that the lubricant filling may be terminated. When this has occured, the piston 29 and the spring 30 may urge lubricant further through an axially directed channel 33 within the shaft 9a the channel 33 opening at the gable face thereof. From there, lubricant comes into a space 34 defined between the gable face and an opposing radially directed face defining the axial extent of the cutter wheel cavity 18. The space 34 is in fluid communication with an axially directed, in the embodiment shown eccentric, cavity 35 accommodating a non-return valve 36 comprising a valve seat 37, a ball 38 and a spring 39. After having entered into the space 34, the lubricant passes into the non-return valve 36, from where it enters a radially directed channel 40 formed in the shaft 9a. Thus, when the internal cavity volume of the cutter unit (cutter wheel with shaft) has been filled up, lubricant, through continued lubricant pumping through the lubricating nipple 26, will start to be urged beyond the sealing ring 32, which is arranged partly encased within a sealing capsule or box 41 placed at shoulder 17 of shaft 9a which, thereby, forms a circumferential stop face for the sealing box.

Within a cylindrical, axially directed, outwardly open bore 42 in the shaft 9a, a high pressure piston 43 has been arranged and is assigned a plate spring 44 a free end portion of the piston 43 engages a circle groove 45 formed in the opposing face of the bottom piece of the cup-shaped carrier body of the cutter wheel 8a. The bottom face of the circle groove 45 has one or more ridges 45' distributed in the circumferential direction which serve the following purpose:

With the hole opener in operation, the entire unit is put into rotation, the cutter wheels 8a–8c rolling along the bore hole wall, rotating on the respective shafts 9a–9c. Then, the high pressure piston 43 slides along the circle groove 45. The ridges 45' will, upon the passage of the piston 43, urge the same into the cylinder bore 42 in the shaft 9a. Thereby, lubricant is pressed through the lateral channel 40 out to the area of the babbitt (bush) 19 and is distributed where the need for lubrication is the largest.

When the piston 43 has passed the ridge 45', the spring 44 will urge the piston 43 back again, resulting in a smaller pressure within the channel 40, lubricant is then pressed from the reservoir 28 via the channel 33, the space 34, the cavity 35 and through the non-return valve 36 to the channel 40, where the cavity following the piston 43 is filled up with lubricant.

We claim:

1. A hole opener used in conjunction with drilling in at least one of boulder and rubble stone formations, the hole opener comprising:

first, second and third sets of cutters;
a tubular carrier body;
first means for fixing the first set of cutters to the tubular carrier body so that the first set of cutters is positioned in a common first lateral plane with respect to a longitudinal axis of the tubular carrier body;
second means for fixing the second set of cutters to the tubular carrier body so that the second set of cutters is located in a second lateral plane with respect to the longitudinal axis of the tubular carrier body; and
third means for fixing the third set of cutters to the tubular carrier body so that the third set of cutters is located in a third lateral plane with respect to the longitudinal axis of the tubular carrier body;
wherein the first means combined with each of the cutters of the first set of cutters extends a first radial distance from the longitudinal axis, the second means combined with each of the cutters of the second set of cutters extends a second radial distance from the longitudinal axis, the third means combined with each of the cutters of the third set of cutters extends a third radial distance from the longitudinal axis, the first radial distance is less than the second radial distance, and the second radial distance is less than the third radial distance;
wherein the first, second and third sets of cutters are respectively sequentially located along the longitudinal axis with the first set of cutters being closest to a lower end of the hole opener and the third set of cutters being closest to an upper end of the hole opener;
wherein relative to an imaginary plane perpendicular to the longitudinal axis the second and third means are angularly displaced from the first means 60° and 120°, respectively.

2. A hole opener used in conjunction with drilling in at least one of boulder and rubble stone formations, the hole opener comprising:

first and second sets of cutters;
a tubular carrier body;
first means for fixing the first set of cutters to the tubular carrier body so that the first set of cutters is positioned in a common first lateral plane with respect to a longitudinal axis of the tubular carrier body;
second means for fixing the second set of cutters to the tubular carrier body so that the second set of cutters is located in a second lateral plane with respect to the longitudinal axis of the tubular carrier body and at an axial distance from the first set of cutters along the longitudinal axis; and
a plurality of wedges;
wherein the first means combined with each of the cutters of the first set of cutters extends a first radial distance from the longitudinal axis and the second means combined with each of the cutters of the second set of cutters extends a second radial distance from the longitudinal axis, and the first radial distance is less than the second radial distance;
wherein each of the cutters of the first and second sets of cutters includes a shaft with the shafts of the first and second sets of cutters being respectively releasably coupled to the first and second means;
wherein for each of the shafts of the first and second sets of cutters the first and second means respectively include an outwardly open conical cavity for accommodating a corresponding shaft of the first and second sets of cutters and two mutually corresponding holes which are laterally oriented relative to the conical cavity, a corresponding one of the plurality of wedges is locatable in the two mutually corresponding holes of each of the first and second means to respectively lock the corresponding shaft of the first and second sets of cutters to the first and second means, each of the shafts of the first and second sets of cutters has a lateral through-hole relative to its corresponding conical cavity in which the corresponding one of the plurality of wedges is located when the cutters of the first and second sets of cutters and locked to the first and second means, and the axis of each of the lateral through-holes forms a non-perpendicular angle with an axis of the corresponding shaft.

3. A hole opener used in conjunction with drilling in at least one of boulder and rubble stone formations, the hole opener comprising:

first and second sets of cutters;
a tubular carrier body;
a stabilizer disposed on the tubular carrier body;
a wear ring disposed on the tubular carrier body;
first means for fixing the first set of cutters to the tubular carrier body so that the first set of cutters is positioned in a common first lateral plane with respect to a longitudinal axis of the tubular body carrier; and
second means for fixing the second set of cutters to the tubular carrier body so that the second set of cutters is located in a second lateral plane with respect to the longitudinal axis of the tubular carrier body and at an axial distance from the first set of cutters along the longitudinal axis;
wherein the first means combined with each of the cutters of the first set of cutters extends a first radial distance from the longitudinal axis, the second means combined with each of the cutters of the second set of cutters extends a second radial distance from the longitudinal axis, and the first radial distance is less than the second radial distance;
wherein the stabilizer includes a stabilizing fins each having a radially extending outer end relative to the longitudinal axis and a plurality of wear members, each of the plurality of wear members releasably attached to a corresponding outer end of the stabilizer;

wherein the stabilizer and the wear ring are separated by a space along the longitudinal axis, the first and second means are located within the space, and the stabilizer and the wear ring are each anchored on the tubular carrier body by at least one of a claw coupling and a jaw clutch.

4. A hole opener used in conjunction with drilling in at least one of boulder and rubble stone formations, the hole opener comprising:

first and second sets of cutters, each of the cutters of the first and second sets of cutters having cutter teeth thereon and further including a shaft;

a tubular carrier body;

first means for fixing the first set of cutters to the tubular carrier body so that the first set of cutters is positioned in a common first lateral plane with respect to a longitudinal axis of the tubular carrier body;

second means for fixing the second set of cutters to the tubular carrier body so that the second set of cutters is located in a second lateral plane with respect to the longitudinal axis of the tubular carrier body and at an axial distance from the first set of cutters along the longitudinal axis;

wherein the first means combined with each of the cutters of the first set of cutters extends a first radial distance from the longitudinal axis, the second means combined with each of the cutters of the second set of cutters extends a second radial distance from the longitudinal axis, and the first radial distance is less than the second radial distance;

wherein each of the shafts of the cutters of the first and second sets of cutters are rotatably and releasably connected to a corresponding one of the first and second means.

5. A hole opener as recited in claim 4, wherein the cutters of the first and second sets of cutters are substantially a cup-shaped hollow piece defining a cylindrical cavity in which the shaft of the cutter is disposed, the hollow piece has an internal circular groove therein which corresponds to an opposing circular groove in an outer portion of the shaft disposed in the cylindrical cavity, the internal circular groove and the opposing circular groove form a closed annulus having approximately a circular cross-section, the closed annulus accommodates a plurality of bearing balls which are insertable into the closed annulus via a lateral channel in the hollow piece, and the lateral channel is lateral relative to an axis of the shaft disposed in the cylindrical cavity and has a radially exiting inner mouth which is in communication with the closed annulus.

6. A hole opener as recited in claim 5, further comprising a plug, a lubricating nipple, a babbitt disposed between a wall of the cylindrical cavity and an opposing end portion of the shaft disposed in the cylindrical cavity, a lubricant receiving reservoir in the shaft disposed in the cylindrical cavity, a spring-loaded piston in the lubricant receiving reservoir, a second lateral channel relative to the axis of the shaft, an axially directed channel relative to the axis of the shaft, a third lateral channel relative to the axis of the shaft, a non-return valve in the third lateral channel, and a fourth lateral channel relative to the axis of the shaft, and wherein the lateral channel is closed with the plug, the plug has the lubricating nipple therein, the lubricating nipple permits lubricant to be pumped therethrough to the babbitt, the second lateral channel opens into an area of the lubricating nipple and into the lubricant receiving reservoir, the lubricant receiving reservoir communicates with one end of the axially directed channel while the other end of the axially directed channel opens into a space defined between a gable face of the shaft and an opposing inner wall of the cutter, and the space communicates via the third lateral channel with the fourth lateral channel that extends radially outwards to the babbitt.

7. A hole opener as recited in claim 6, wherein the fourth lateral channel communicates with an open cylinder bore in the shaft, the open cylinder bore is axially oriented in a direction of the axis of the shaft and is open toward the inner wall of the cutter and has an axially aligned reciprocating spring-loaded piston therein, an outer end portion of the axially aligned reciprocating spring-loaded piston is slidably engaged in an internal circular groove in the inner wall of the cutter, the internal circular groove in the inner wall of the cutter has at least one ridge which acts on and pushes back the axially aligned reciprocating spring-loaded piston each time the axially aligned spring-loaded piston contacts the at least one ridge during rotation of the cutters thereby causing lubricant to be squeezed out of the cylinder bore and supplied to the babbitt via the fourth lateral channel.

* * * * *